United States Patent [19]

Howard

[11] Patent Number: 5,182,444
[45] Date of Patent: Jan. 26, 1993

[54] SPLIT LENS DISPLACED LONG FROM EACH OTHER ALONG PLANE OF CUT

[75] Inventor: James W. Howard, Natick, Mass.

[73] Assignee: Digital Equipment Corporation, Maynard, Mass.

[21] Appl. No.: 606,101

[22] Filed: Oct. 31, 1990

Related U.S. Application Data

[62] Division of Ser. No. 365,243, Jun. 12, 1989, Pat. No. 4,987,292.

[51] Int. Cl.⁵ .............................................. G02B 3/00
[52] U.S. Cl. ................................ 250/201.5; 250/201.5
[58] Field of Search .................... 250/201.5; 350/417, 350/432, 436, 479; 359/720

[56] References Cited

U.S. PATENT DOCUMENTS

| | | | |
|---|---|---|---|
| 1,305,984 | 6/1919 | Becker | 359/720 |
| 2,388,673 | 11/1945 | Brown | 359/720 |
| 2,433,338 | 12/1947 | Brown | 359/720 |
| 2,979,997 | 4/1961 | Bertsch | 359/720 |
| 4,698,492 | 10/1987 | Ohtaka et al. | 250/201.8 |
| 4,712,205 | 12/1987 | Sinid | 369/44.41 |
| 4,818,069 | 4/1989 | Maan | 350/252 |
| 4,841,509 | 6/1989 | Kamisada et al. | 369/44.23 |
| 4,886,342 | 12/1989 | Kudo et al. | 350/417 |
| 4,891,799 | 1/1990 | Nakano | 250/201.5 |
| 4,900,910 | 2/1990 | Doi | 250/201.5 |

FOREIGN PATENT DOCUMENTS 220961  1/1925  Brazil ................................. 359/720

OTHER PUBLICATIONS

Bouwhuis, G. et al., "Principles of Optical Disk Systems", Philips Research Laboratories, Eindhoven, pp. 70-81.

*Primary Examiner*—David C. Nelms
*Assistant Examiner*—S. Allen
*Attorney, Agent, or Firm*—Fish & Richardson

[57] ABSTRACT

A method and apparatus for measuring the focus and tracking of a light beam on a medium in an optical data storage system. A split lens, comprising two halves of a lens separated along the optical axis and displaced from each other along the plane of the cut, is used to focus the light reflected or refracted from the medium onto a quad-cell. The quad cell comprises four light sensors arranged in four quadrants about a center point. According to the invention, the amount of light incident on quadrants of the quad-cell indicates the focus and alignment of the light beam on the medium. In accordance with another aspect of the invention, the above apparatus is used to measure the collimation or distribution of intensity of a light beam. Another aspect of the invention is the manufacture of the split lens. A lens is sawed into two halves and the halves are mounted using a housing displaced from each other along the plane of the cut.

4 Claims, 6 Drawing Sheets

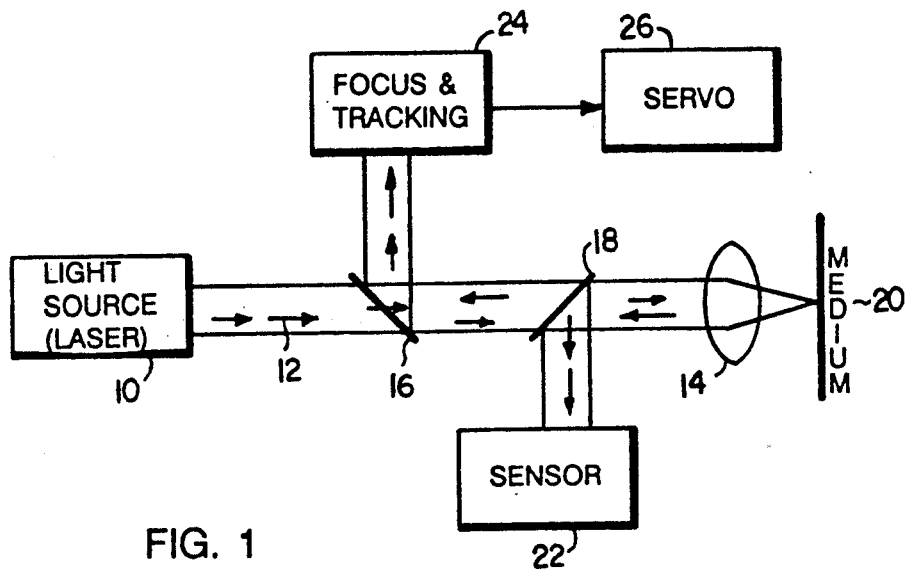
FIG. 1
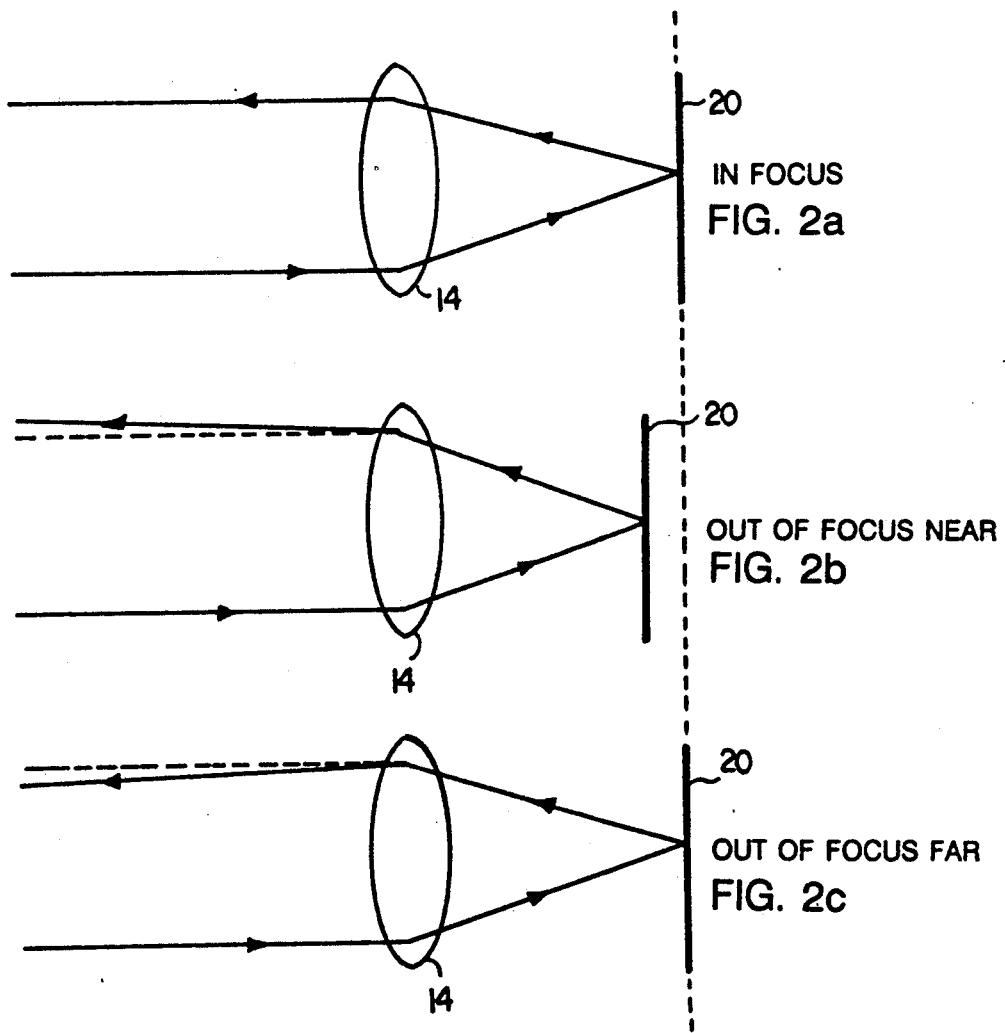
IN FOCUS
FIG. 2a
OUT OF FOCUS NEAR
FIG. 2b
OUT OF FOCUS FAR
FIG. 2c

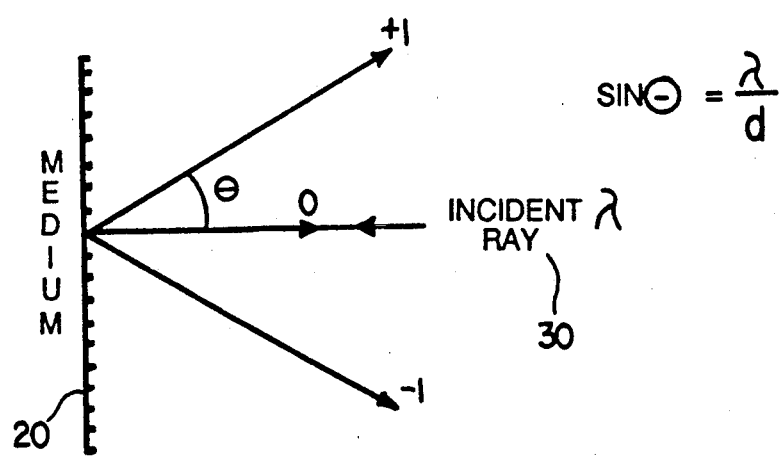
FIG. 3a
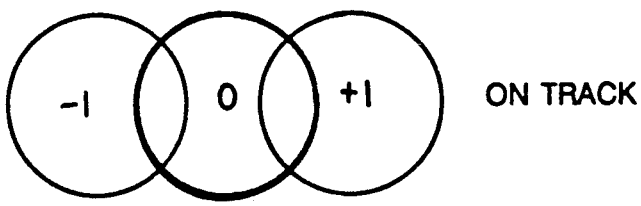
FIG. 3b  ON TRACK
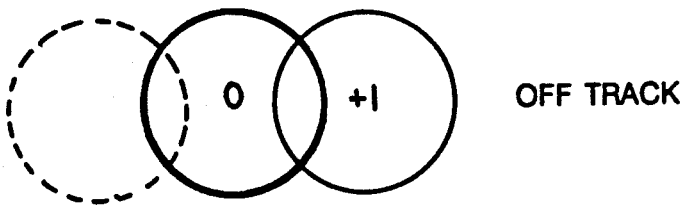
FIG. 3c  OFF TRACK
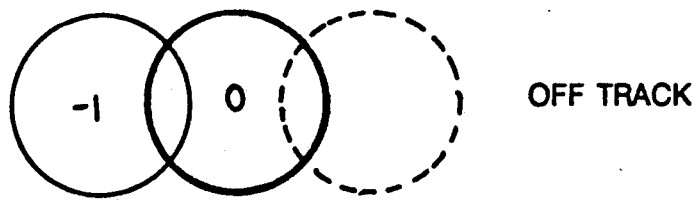
FIG. 3d  OFF TRACK

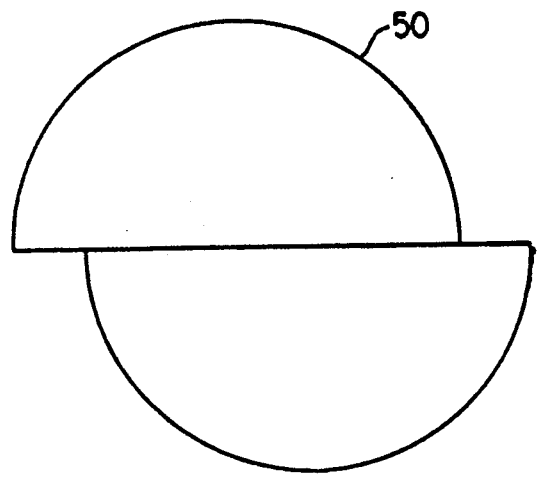
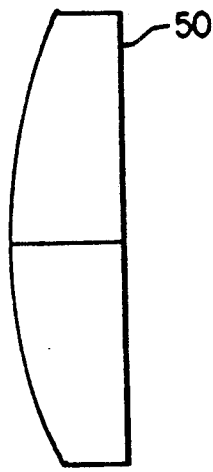
FIG. 4a-1  FIG. 4a-2
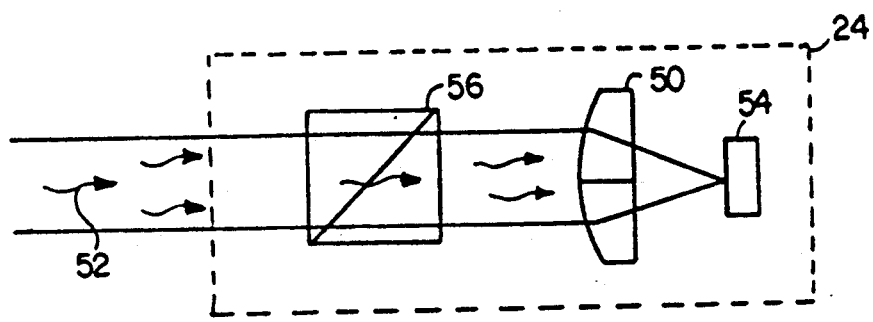
FIG. 4b
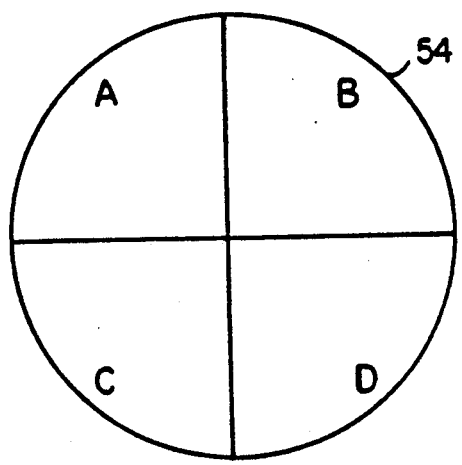
FIG. 4c

IN FOCUS

OUT OF FOCUS NEAR

OUT OF FOCUS FAR

SPLIT LENS DISPLACED LONG FROM EACH OTHER ALONG PLANE OF CUT

This is a division of application Ser. No. 07/365,243, filed Jun. 12, 1989, now U.S. Pat. No. 4,987,292.

BACKGROUND OF THE INVENTION

This invention relates to techniques for generating focus and tracking error signals in an optical storage system.

Optical disk systems use a focused laser beam to read or write data on a storage medium. These systems may incorporate read-only, write-once, or erasable storage technology. A common component of such systems is an objective lens disposed over the storage medium (typically a disk) which collects radiation from a light source (typically a laser) and focuses it onto the selected data track in the medium. The character of the light reflected from the medium is indicative of the data recorded in the selected data track. In a typical system, the reflected light is routed to a sensor which, in combination with detection circuitry, recovers this data.

Information indicative of the precision of the focus and tracking of the light source can also be obtained from the light reflected from the medium. To use this information, a typical optical disk system also routes the reflected light to a focus and tracking sensor, which relays error signals to an active control system which servos the focus and tracking of the laser beam.

Several methods for independently sensing focus and tracking errors have been employed. Among these are the biprism and astigmatic methods. The biprism method is the more sensitive, but the astigmatic method offers a useful tradeoff between focus error sensitivity and acquisition range. However, both methods require the manufacture of optical components of unusual shape.

SUMMARY OF THE INVENTION

It is an object of the invention to provide an apparatus for independently sensing focus and tracking errors in an optical system, where the apparatus has high sensitivity and does not require the manufacture of an unconventional lens, per se.

A general feature of the invention is a method and apparatus for measuring the focus and tracking of a light beam on a medium in an optical data storage system. A split lens, preferably comprising two halves of a lens separated along a plane including the optical axis and displaced from each other along the plane of the cut, is used to focus the light reflected or refracted from the medium onto a detector, preferably a quad-cell. The quad-cell comprises four light sensors arranged in four quadrants about a center point. According to the invention, the amount of light incident on quadrants of the quad-cell indicates both the focus and alignment of the light beam on the medium.

Another general feature of the invention is a method and apparatus for measuring the collimation or distribution of intensity of a light beam using the above-described split lens and quad-cell.

Another aspect of the invention is the manufacture of the split lens. A lens is sawed preferably into two halves and the halves are mounted displaced from each other along the plane of the cut.

DESCRIPTION OF THE PREFERRED EMBODIMENTS

We first briefly describe the drawings.

FIG. 1 is a block diagram of an optical data storage system.

FIGS. 2A through 2C illustrate the effects of focus errors on the light reflected off the medium of an optical data storage system.

FIGS. 3A through 3D illustrate the effects of tracking errors on the light reflected off the medium of an optical data storage system.

FIGS. 4A1 and 4A2 both show a diagram of a split lens according to the invention.

FIG. 4B is a diagram of a focus and tracking detector according to the invention.

FIG. 4C is a diagram of a quad-cell for use in the focus and tracking detector of FIG. 4B.

Figures 5A, 5B, 5C, 5D:
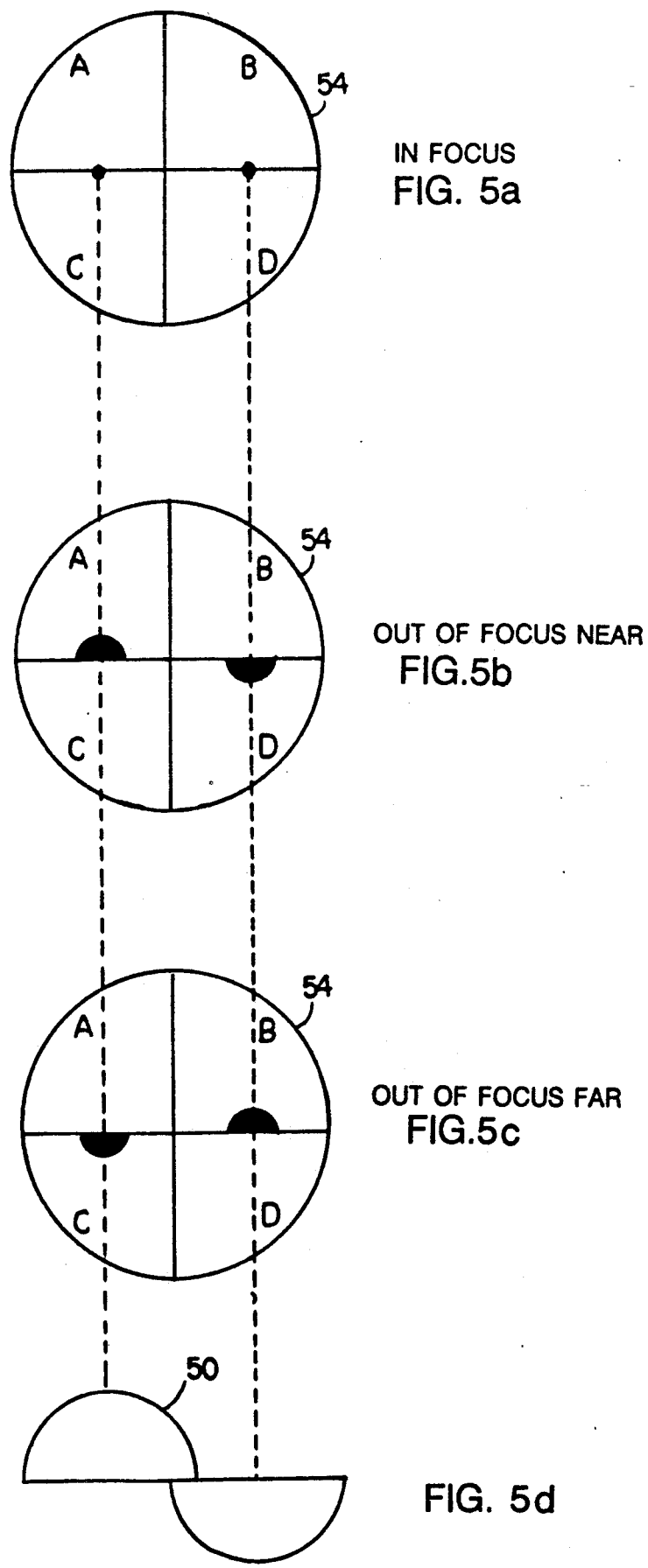

FIGS. 5A through 5C illustrate the patterns of light on the quad-cell of FIG. 4C in the presence of focus errors.

FIG. 5D is a diagram relating the orientation of the split lens to the patterns of FIGS. 5A through 5C.

Figure 6:
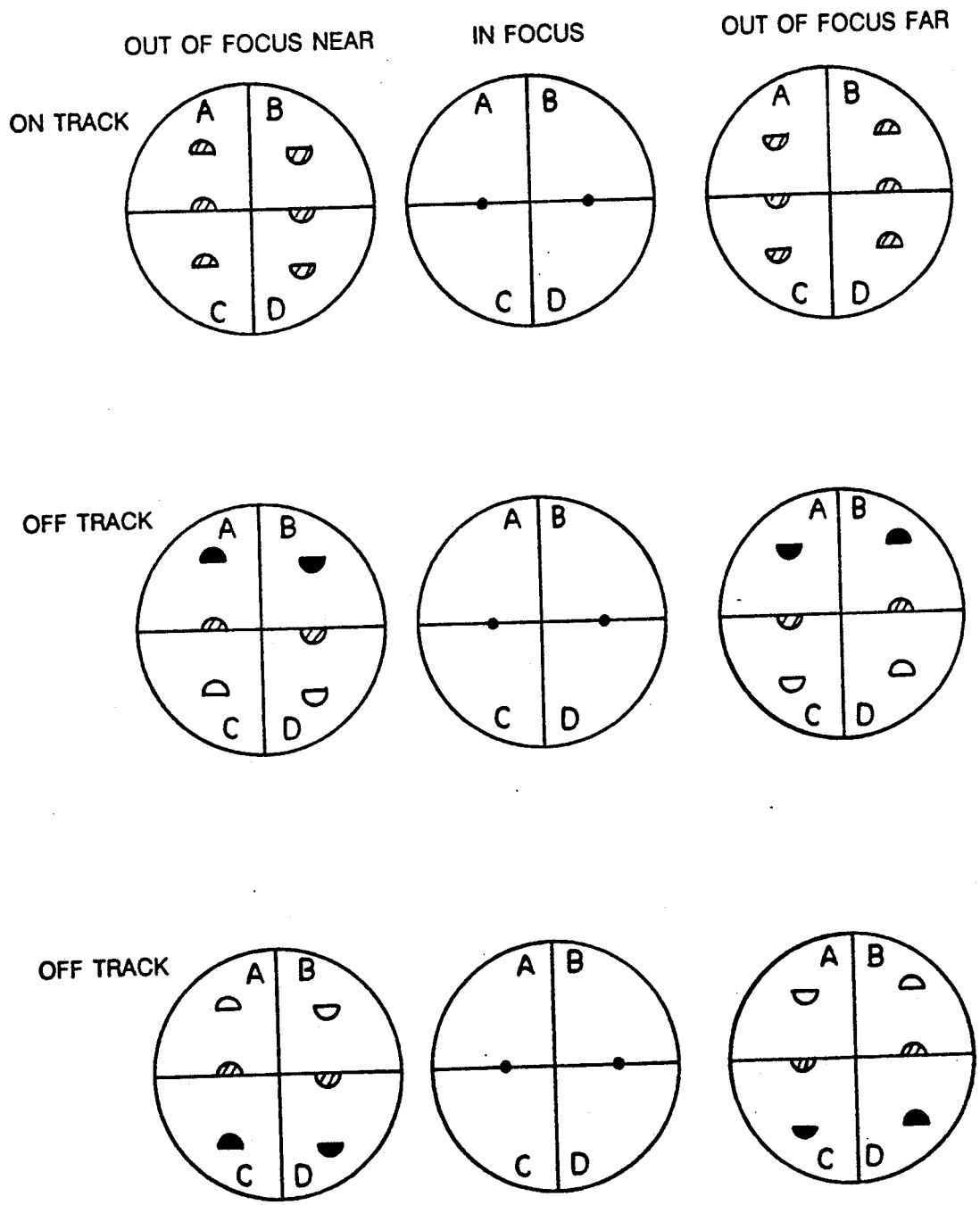

FIG. 6 is a diagram illustrating the patterns of light on the quad-cell of FIG. 4C in the presence of tracking errors.

Figure 7A:
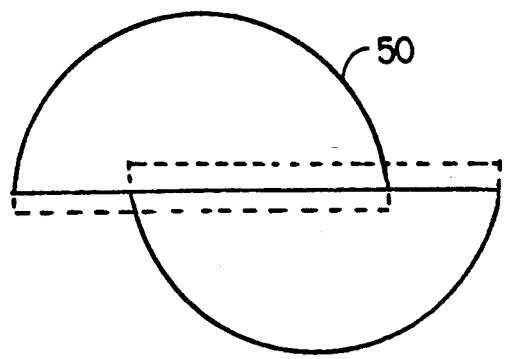

FIG. 7A is a diagram illustrating the offset of the split lens caused by the kerf of the saw used in manufacture according to one embodiment of the invention.

Figure 7B:
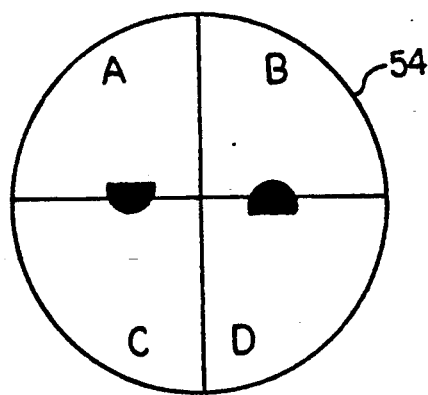

FIG. 7B is a diagram illustrating the influence of the saw kerf of FIG. 7A on the patterns of light illuminating the quad-cell.

Figure 7C:
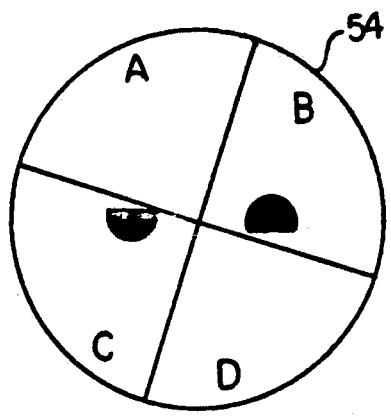

FIG. 7C is a diagram illustrating a rotated quad-cell compensating for the saw kerf of FIG. 7A.

STRUCTURE

FIG. 1 is a block diagram of a system for reading or writing a storage medium. Light source 10, typically a laser, directs collimated light 12 toward objective lens 14. Collimated light 12 passes through two beam splitters 16 and 18 and is focused by objective lens 14 onto medium 20. Light reflected from medium 20 is collected by objective lens 14 and routed in the reverse direction of the original collimated light. When the reflected beam intersects beam splitter 18, a portion of the beam is directed towards data sensor 22, where it is processed to determine the data on media 20. The portion of the reflected beam which penetrates beam splitter 18 is incident upon beam splitter 16, where a second portion of the beam is directed toward focus and tracking sensor 24. Tracking and focus errors are detected by sensor 24, and are used to control the focusing of the beam, for example, by adjusting the position of objective lens 14 through servo mechanism 26.

FIGS. 2A through 2C illustrate the effects of focus errors on the reflected laser beam. When objective lens 14 is properly oriented relative to medium 20, as seen in FIG. 2A, the reflected beam is fully collimated. As illustrated in FIG. 2A, a ray of the incident beam is focused by objective lens 14, reflects off of medium 20, and is collimated by objective lens 14 such that the original path of the ray and the reflected path of the ray are parallel. However, as seen in FIG. 2B, when the medium 20 is too near to objective lens 14, a reflected ray is not properly collimated by objective lens 14, and the original path of the ray and the reflected path of the ray are not parallel. In this case, the reflected beam returning from objective lens 14 is divergent. As seen in FIG. 2C, when medium 20 is too far from objective lens 14, a reflected ray is again improperly collimated by objective lens 14, such that the reflected beam returning from objective lens 14 is convergent.

FIG. 3A illustrates the diffractive effects of the storage medium 20. Medium 20 typically comprises a corrugated surface, where the corrugations form data storage tracks on the surface of medium 20. As illustrated in FIG. 3A, these corrugations form a diffraction grating, such that a ray 30 of an incident light beam is reflected from the medium in one of several modes. In the "0" mode, as illustrated, the angle of incidence is equal to the angle of refraction. In the "+1" and "−1" modes, the angle of incidence differs from the angle of refraction by an angle $\theta$, where $\theta$ is related to the depth d of the corrugations and the wavelength $\lambda$ of the incident light ray 30. The relationship is governed by the equation $\lambda = d\sin(\theta)$.

Where the incident light is a focused laser beam, the relative excitation of the "+1" and "−1" modes is strongly dependent upon the locations of the focused laser beam and the diffracting corrugations. When the focused laser beam is on-track, substantially equal numbers of light rays excite the "+1" and "−1" modes, due to the even distribution of light rays across the diffracting corrugations. However, when the focused laser beam is off-track, unequal numbers of light rays excite the "+1" and "−1" modes of the grating, due to the uneven distrubution of light rays across the diffracting corrugations.

FIGS. 3B through 3D show the nature of the light reflected from the medium 20 surface. The excitation of the "+1" and "−1" modes of the diffraction grating create two lobes in the reflected light beam. These lobes have been labelled "+1" and "−1" in the Figs. to indicate their relationship to the correspoding modes of the grating. In FIG. 3B, the focused laser beam is substantially on-track, and thus the "+1" and "−1" modes are substantially equally excited. Therefore, the intensity of the "+1" and "−1" lobes is substantially equal in FIG. 3B. However, in FIG. 3C, the focused laser beam is off-track, thus creating an uneven excitation of the "+1" and "−1" modes of the grating. Because of this, the "+1" lobe of the reflected light is substantially more intense than the "−1" lobe of the reflected light, and has been indicated as such by the use of a darker outline on the "+1" lobe and a dotted outline on the "−1" lobe. In FIG. 3D, the focused laser beam is off-track in the opposite direction than in FIG. 3C. Because of the resulting uneven excitation of the "+1" and "−1" modes of the grating, the "−1" lobe of the reflected light is substantially more intense than the "+1" lobe of the reflected light, indicated by the use of a darker outline on the "−1" lobe and a dotted outline on the "+1" lobe.

According to the invention, focus and tracking errors are sensed by using a lens which is cut in half along a plane containing the optical axis. The two lens halves are displaced slightly along the plane of the cut, perpendicular to the optical axis. A split offset lens 50 is shown in FIG. 4A. The displacement of the lens halves has been exaggerated in FIG. 4A for clarity.

Split lens 50 is used in a focus and tracking error detector 24 as shown in FIG. 4B. Reflected laser beam 52 is focused by split lens 50 onto a quad-cell 54. In applications using beams with differing wavelengths for reading and writing, an isolator 56 may be included in the path of reflected beam 52 to shield the quad cell from the high-intensity beam.

A quad cell is depicted in FIG. 4C. The quad cell comprises four quadrants lettered A, B, C, and D. Each quadrant contains a photosensitive cell capable of measuring the intensity of the light incident on its respective quadrant.

As shown in FIGS. 5A through 5D, the split lens focuses respective halves of the reflected light beam into two regions on the quad-cell. The two regions are displaced on the quad cell along the plane of the lens cut, by the same amount that the lens halves are displaced. FIG. 5D illustrates the displacement of the split lens halves to clarify this relationship. For the purposes of FIGS. 5A through 5D, only the effects of the "0" lobe of the reflected light beam have been shown. The effects of the "+1" and "−1" lobes of the reflected light beam will be fully discussed in conjunction with FIGS. 6A through 6C.

As shown in FIG. 5A, when the medium is in focus, collimated light is incident upon split lens 50, and is focused to two points on the boundary between pairs of detectors forming the quad-cell. As shown in FIG. 5B, when the medium is out of focus because it is too near the objective lens, a diverging beam is incident on the split lens and the light patterns on the bi-cell will be semicircles, where substantially all the light will strike diagonally opposite quadrants of the quad cell. As shown in FIG. 5C, when the medium is out of focus by being too far from the objective lens, a converging beam is incident on the split lens. The light patterns in this case will also be semicircles, with substantially all the light striking alternate opposite quadrants of the quad cell.

In consideration of the above relationships, a focus error signal may be simply derived from the outputs of the four quad-cell detectors. For example, where the outputs of the four quad cell detectors are the voltages $V_A$, $V_B$, $V_C$, and $V_D$ (increasing positive voltage indicating increasing detected light intensity), an error signal may be formed by an op-amp circuit calculating the quantity:

$$V_{Ferr} = (V_A + V_D) - (V_B + V_C).$$

When $V_{Ferr}$ is negative, it is indicated that the medium is out of focus far, when positive, it is indicated that the medium is out of focus near, and when zero, it is indicated that the medium is in focus.

As shown in FIG. 6, the split lens also focuses the portions of the reflected light beam corresponding to the "+1" and "−1" modes of the corrugated medium surface. Assuming that the medium is in focus, the returning light beam containing the "0", "+1" and "−1" lobes is collimated (because the reflected and refracted light beams all originate at the focal point of the objective lens). In this case, the returning light beam is focused by the split lens to form two displaced spots, one in each half of the quad-cell, as shown in the center column of FIG. 6. If the medium is out of focus, the spots corresponding to the "+1" and "−1" lobes of the returning light beam are displaced vertically (because the refracted beams are not collimated by the objective lens). In this case, the returning light beam is focused into six half-moon spots on the quad-cell, as shown in the left and right columns of FIG. 6.

When the focused light beam is on track, the intensity of the refracted light beams corresponding to the "+1"

and "−1" modes are substantially equally excited. In this case, the spots illuminating the quad cell are substantially equal in intensity, as shown in the first row of FIG. 6. However, when the focused light beam is off-track, the refracted light beams corresponding to the "+1" and "−1" modes are inequally excited. In this case, when the medium is out of focus, the half-moons illuminating one side of the quad cell are more intense than the half moons illuminating the other side. As shown in the second row of FIG. 6, when the light beam is off-track in one direction, the spots in the A and B quadrants are more intense. As shown in the third row of FIG. 6, when the focused light beam is off-track in the other direction, the spots in the C and D quadrants are more intense.

In consideration of the above relationships, a tracking error signal may also be simply derived from the outputs of the four quad-cell detectors. For example, an error signal may be formed by an op-amp circuit calculating the quantity:

$$V_{Terr} = (V_A + V_B) - (V_C + V_D).$$

When $V_{Terr}$ is negative, it is indicated that the focused laser beam is off-track in one direction, when positive, it is indicated that the focused laser beam is off-track in the other direction, and when zero, it is indicated that the focused laser beam is on-track.

The split lens may be manufactured, in one embodiment of the invention, by sawing a conventional lens, for example a plano-convex lens of BK7 optical glass having an index of refraction of approximately 1.51, into two halves with a diamond saw. The two halves are then bonded together or encased in a housing which supports the two halves in the proper orientation.

FIG. 7A shows a split lens manufactured in the above fashion. As seen in FIG. 7A, the kerf of the diamond saw causes the resulting halves, when reassembled, to be slightly displaced towards the plane of the cut. This displacement is clarified in FIG. 7A by dotted lines which indicate the remainder of the semi-circular sections which would correspond to a perfectly cleaved lens.

FIG. 7B shows the effect of the saw kerf on the error signal spots which illuminate the quad-cell. The spots are themselves displaced towards the plane of the lens cut. As shown in FIG. 7B, when the borders of the quad-cell are exactly aligned to the cut in the lens, the "0" lobe spots overlap the centerline and illuminate more than one cell.

FIG. 7C shows a quad-cell which has been rotated to bring the "0" lobe spots within the borders of the respective quadrants of the quad-cell. As can be seen in FIG. 7C, the resulting orientation of the spots and the quad-cell is near to the ideal shown in FIG. 6.

Other embodiments of the invention are within the scope of the appended claims. For example, the halves of the split-lens may be manufactured independently, and later combined, thus eliminating the sawing step. In other embodiments, the lens may be manufactured as a whole structure. Also, the lens may be divided by means other than disclosed above.

The invention may be used in any applications requiring measurements of the collimation and uniformity of intensity of an optical beam, and should not be construed as limited to focus and tracking detectors for optical storage systems. Additionally, the configuration of an optical data storage apparatus using the invention may be different from that shown in FIG. 1. Other embodiments are also included within the scope of the following claims.

I claim:

1. A method of manufacturing a split lens, comprising:
   providing a lens
   sawing said lens into two halves, which are complete but for the kerf of the saw, along a plane containing the optical axis, and
   mounting said lens halves joined together at the plane of the cut and displaced from each other along the plane of the cut in order to avoid offset effects.

2. A method of manufacturing a split lens, comprising:
   providing first and second partial lenses of transparent material which, if joined together in a given orientation, form a complete lens with an evenly curved focusing surface,
   mounting said partial lenses joined together displaced linearly from said given orientation in order to minimize offset effects.

3. A split lens manufactured by the steps of
   providing a lens
   sawing said lens into two halves, which are complete but for the kerf of the saw, along a plane containing the optical axis, and
   mounting said lens halves joined together at the plane of the cut and displaced from each other along the plane of the cut in order to minimize offset effects.

4. A split lens manufactured by the steps of
   providing first and second partial lenses of transparent material which, if joined together in a given orientation, form a complete lens with an evenly curved focusing surface,
   mounting said partial lenses joined together displaced linearly from said given orientation in order to minimize offset effects.

* * * * *